United States Patent
Sadowara

(10) Patent No.: US 10,897,554 B2
(45) Date of Patent: Jan. 19, 2021

(54) SYSTEM AND METHOD FOR CORRECTLY DETECTING A PRINTING AREA

(71) Applicants: KABUSHIKI KAISHA TOSHIBA, Tokyo (JP); TOSHIBA TEC KABUSHIKI KAISHA, Tokyo (JP)

(72) Inventor: Tetsuya Sadowara, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/581,823

(22) Filed: Sep. 25, 2019

(65) Prior Publication Data

US 2020/0021713 A1  Jan. 16, 2020

Related U.S. Application Data

(62) Division of application No. 15/702,966, filed on Sep. 13, 2017, now Pat. No. 10,432,821.

(51) Int. Cl.
*H04N 1/40* (2006.01)
*H04N 1/409* (2006.01)
*H04N 1/387* (2006.01)
*H04N 1/62* (2006.01)

(52) U.S. Cl.
CPC .......... *H04N 1/4097* (2013.01); *H04N 1/3872* (2013.01); *H04N 1/3878* (2013.01); *H04N 1/62* (2013.01)

(58) Field of Classification Search
None
See application file for complete search history.

(56) References Cited

U.S. PATENT DOCUMENTS 7,738,696 B2   6/2010  Bannai
9,769,354 B2   9/2017  Thrasher et al.

OTHER PUBLICATIONS

Non-Final Office Action for U.S. Appl. No. 15/702,966 dated Dec. 7, 2018.

*Primary Examiner* — Barbara D Reinier
(74) *Attorney, Agent, or Firm* — Amin, Turocy & Watson, LLP

(57) ABSTRACT

In accordance with an embodiment, in an image processing apparatus which includes an arithmetic element and executes an image processing on a first image data read by a scanner from a manuscript including a printing area, the arithmetic element acquires the first image data from the scanner, generates second image data by executing an image processing on the first image data, recognizes the printing area in the first image data based on the second image data, and cuts out an image in the printing area from the first image data as a third image data.

16 Claims, 10 Drawing Sheets

SYSTEM AND METHOD FOR CORRECTLY DETECTING A PRINTING AREA

CROSS-REFERENCE TO RELATED APPLICATION

This application is a Divisional of application Ser. No. 15/702,966 filed on Sep. 13, 2017, the entire contents of which are incorporated herein by reference.

FIELD

Embodiments described herein relate generally to an image processing apparatus, an image forming apparatus, and methods related thereto.

BACKGROUND

An image processing apparatus executes a printing in response to a print request. The image processing apparatus has a conveyance section for conveying a printing medium such as a paper and forms an image on a printing medium to discharge the printing medium on which the image is formed. The image processing apparatus reads a paper (manuscript) on which characters and illustration are printed with a scanner to form image data.

The image processing apparatus recognizes a printing area in which characters and illustration are printed in the image data. The image processing apparatus cuts out an image in the printing area from the image data.

In a case in which the scanner reads the manuscript, there is a possibility of generating noise in the image data by an obstacle (for example, rubbish) on an optical path of the scanner. There is a problem that there is a possibility that the image processing apparatus cannot correctly detect the printing area due to the noise in a case of recognizing the printing area from the image data containing the noise.

DETAILED DESCRIPTION

In accordance with an embodiment, in an image processing apparatus which includes an arithmetic element and executes an image processing on a first image data read by a scanner from a manuscript including a printing area, the arithmetic element acquires the first image data from the scanner, generates second image data by executing an image processing on the first image data, recognizes the printing area in the first image data based on the second image data, and cuts out an image in the printing area from the first image data as a third image data.

Hereinafter, an image processing apparatus and an image forming apparatus according to an embodiment are described with reference to the accompanying drawings.

Figure 1:
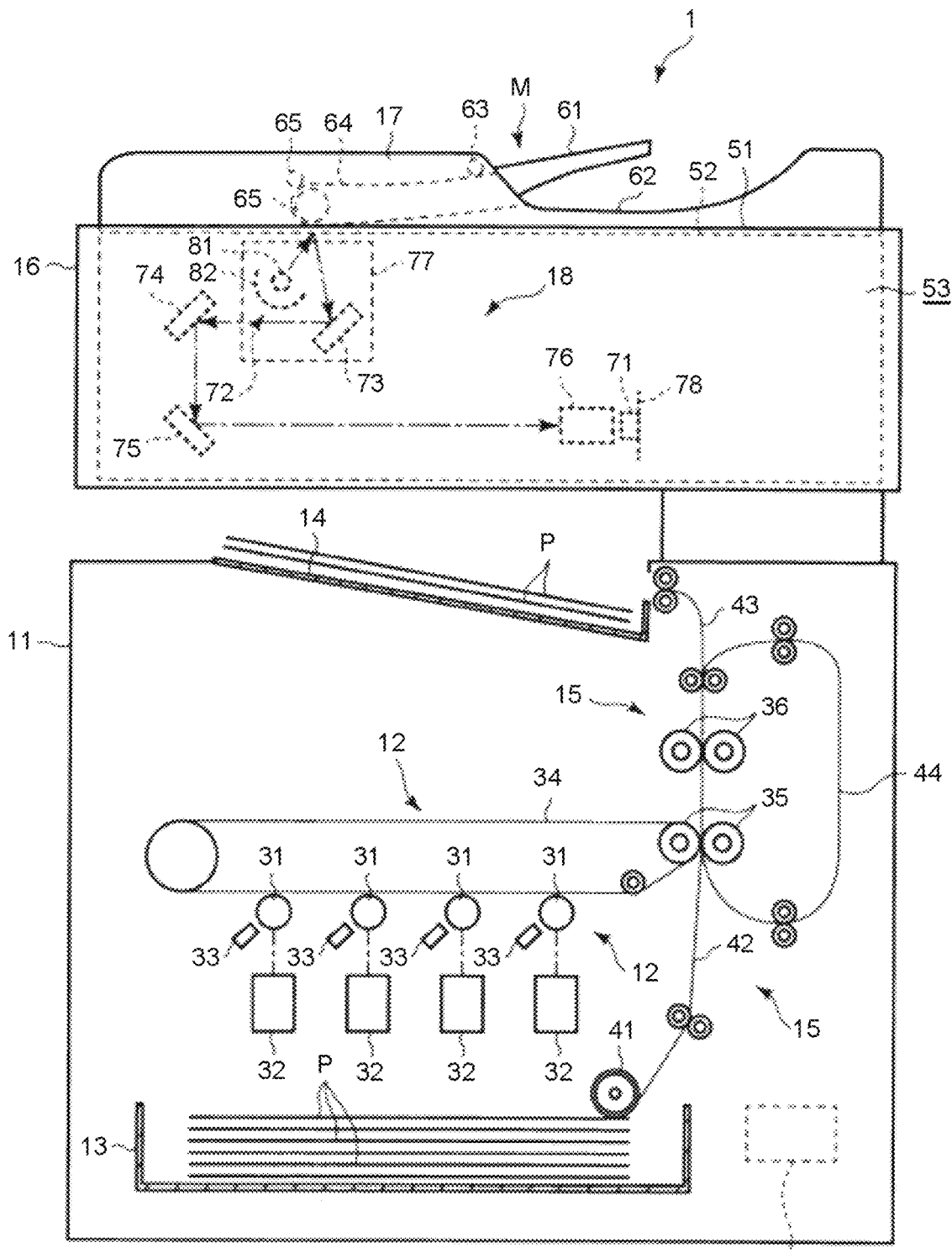
FIG. 1 is a diagram illustrating an example of an image forming system, a conveyance system and an image capturing system in a housing in an image forming apparatus according to an embodiment.
Figure 2:
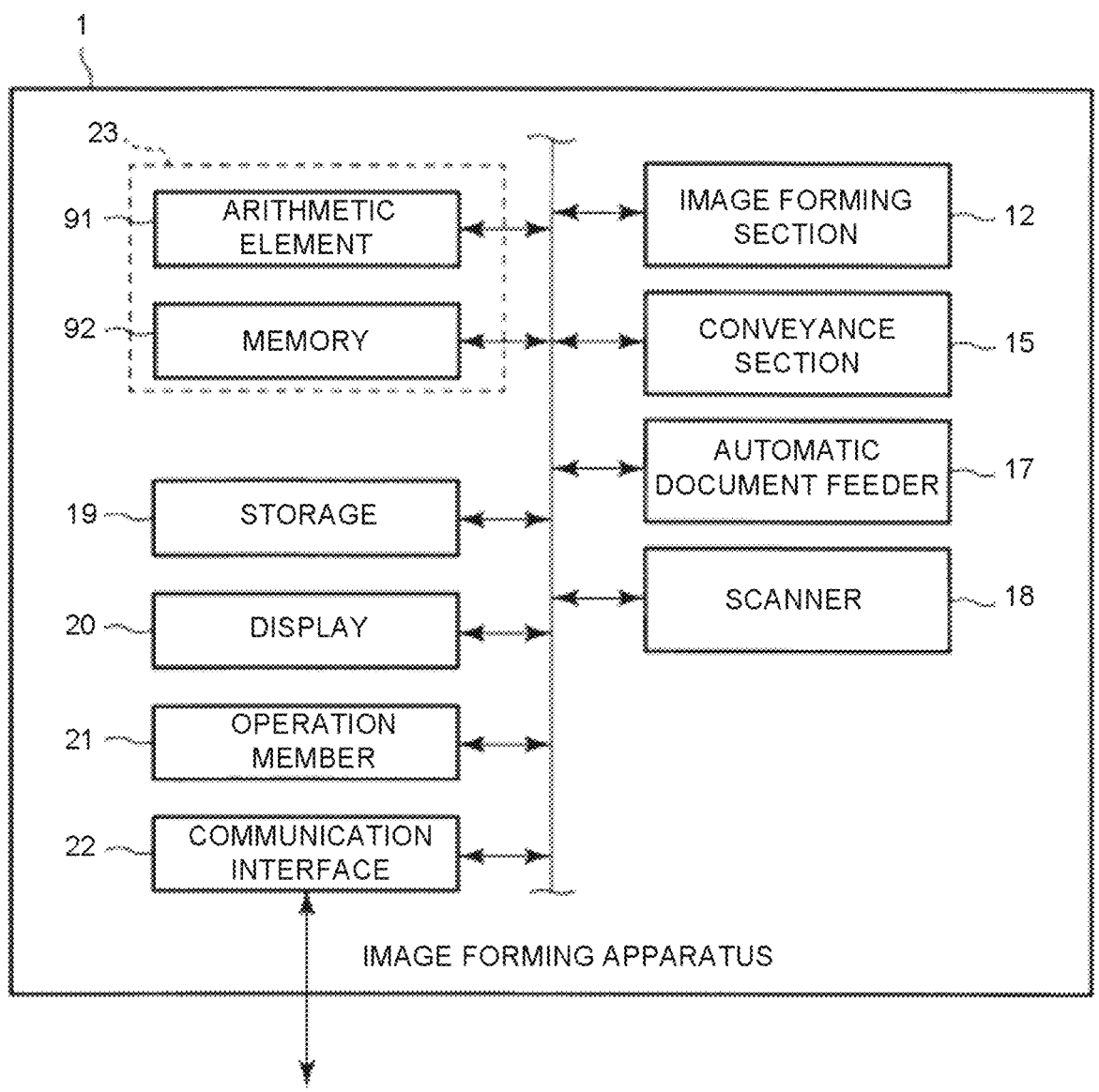
FIG. 2 is a diagram illustrating an example of a control system of the image forming apparatus according to the embodiment.

First, an image forming apparatus 1 is described. FIG. 1 and FIG. 2 are views exemplifying the constitution of an image forming apparatus 1. FIG. 1 is a diagram illustrating an example of an image forming system, a conveyance system and an image capturing system in a housing in the image forming apparatus 1 according to an embodiment. FIG. 2 is a diagram illustrating a control system of the image forming apparatus 1.

The image forming apparatus 1 is, for example, a multi-function printer (MFP) that executes various processing such as image formation while conveying a printing medium such as a paper sheet and the like. The image forming apparatus 1 includes an image forming system for forming an image on the printing medium, a conveyance system for conveying the printing medium, an image capturing system for reading the image from a manuscript, and a control system for executing various control and image processing.

The image forming apparatus 1 includes a housing 11, an image forming section 12, a sheet feed cassette 13, a sheet discharge tray 14, a conveyance section 15, a document table 16, an automatic document feeder (ADF) 17, a scanner 18, a storage 19, a display 20, an operation member 21, a communication interface 22, and a controller 23.

The housing 11 is used to hold the image forming section 12, the sheet feed cassette 13, the sheet discharge tray 14, the conveyance section 15, the document table 16, the ADF 17, the scanner 18, the storage 19, the display 20, the operation member 21, the communication interface 22, and the controller 23.

First, the image forming system of the image forming apparatus 1 is described.

The image forming section 12 forms an image on a printing medium P. For example, the image forming section 12 includes a drum 31, an exposure device 32, a developing device 33, a transfer belt 34, a transfer roller 35, and a fixing roller 36.

The drum 31 is a photoconductive drum formed into a cylindrical shape. The drum 31 is provided to contact the transfer belt 34. A surface of the drum 31 is uniformly charged by an electrostatic charger (not shown). The drum 31 rotates at a constant speed by a driving mechanism (not shown).

The exposure device 32 forms an electrostatic latent image on the charged drum 31. The exposure device 32 enables a light emitting element to emit light in response to a print data and irradiates the surface of the drum 31 with the light. As a result, the exposure device 32 forms a latent image (electrostatic latent image) on the surface of the drum 31.

The developing device 33 attaches a toner (developer) to the electrostatic latent image formed on the drum 31. As a result, the developing device 33 forms a toner image on the surface of the drum 31.

The transfer belt 34 receives the toner image formed on the surface of the drum 31 to transfer it onto the printing medium P. The transfer belt 34 is moved by a rotation of a roller. The transfer belt 34 receives the toner image formed on the drum 31 at a position in contact with the drum 31 and conveys the received toner image to the transfer roller 35.

The transfer rollers 35 sandwich the printing medium P and the transfer belt 34 therebetween. The transfer roller 35 transfers the toner image on the transfer belt 34 onto the printing medium P.

The fixing roller 36 can press against the printing medium P. The fixing roller 36 is heated by a heater (not shown). In a heated state, the fixing roller 36 melts the toner formed on the printing medium P and fixes the toner image on the printing medium P by applying pressure to the printing medium P. Thereby, the fixing roller 36 forms an image on the printing medium P.

The drum 31, the exposure device 32, and the developing device 33 of the image forming section 12 may be provided for different colors such as cyan, magenta, yellow and black, for example. In this case, a plurality of the developing devices 33 holds toner of different colors, respectively.

The conveyance system of the image forming apparatus 1 is described.

The sheet feed cassette 13 houses the printing medium P. The sheet feed cassette 13 can supply the printing medium P from the outside of the housing 11. For example, the sheet feed cassette 13 can be pulled out from the housing 11.

The sheet discharge tray 14 supports the printing medium P discharged from the housing 11.

The conveyance section 15 conveys the printing medium P. The conveyance section 15 includes a fetching roller 41, a sheet feed conveyance path 42, a sheet discharge conveyance path 43, an inversion conveyance path 44, a plurality of guides (not shown), and a plurality of conveyance rollers (not shown).

The fetching roller 41 fetches the printing medium P housed in the sheet feed cassette 13 to the sheet feed conveyance path 42.

The sheet feed conveyance path 42 is used for conveying the printing medium P fetched from the sheet feed cassette 13 by the fetching roller 41 to the image forming section 12. The sheet feed conveyance path 42 is constituted by a plurality of the guides and a plurality of conveyance rollers.

The sheet discharge conveyance path 43 is used for discharging the printing medium P on which an image is formed by the image forming section 12 from the housing 11. The printing medium P passing through the sheet discharge conveyance path 43 is discharged to the sheet discharge tray 14. The sheet discharge conveyance path 43 is constituted by a plurality of guides and a plurality of conveyance rollers.

The inversion conveyance path 44 is used for reversing the front and back sides and the forth and rear sides of the printing medium P on which the image is formed by the image forming section 12, and for feeding the printing medium P again to the image forming section 12. The inversion conveyance path 44 is constituted by a plurality of guides and a plurality of conveyance rollers.

The image capturing system of the image forming apparatus 1 is described.

The document table 16 is used to place a paper sheet (manuscript) M on which characters and illustrations are printed. The document table 16 has a glass plate 52 constituting an arrangement surface 51 on which a manuscript M is placed and a space 53 arranged at a surface opposite to the arrangement surface 51 of the glass plate 52 to house the scanner 18.

The ADF 17 conveys the manuscript M to enable the scanner 18 to read the manuscript M. The ADF 17 is provided on the document table 16 in a freely openable manner. The ADF 17 includes a sheet feed tray 61, a sheet discharge tray 62, a fetching roller 63, a reading conveyance path 64, and a conveyance roller 65.

The sheet feed tray 61 is used to place the manuscript M.

The sheet discharge tray 62 supports the manuscript M discharged from the ADF 17.

The fetching roller 63 fetches the manuscript M placed on the sheet feed tray 61 one by one and supplies it to the reading conveyance path 64.

The reading conveyance path 64 is constituted by the conveyance roller 65, and plural guides (not shown). The reading conveyance path 64 conveys the manuscript M fetched from the sheet feed tray 61 by the fetching roller 63 while enabling the manuscript M to closely contact the glass plate 52 of the document table 16 to discharge it from the sheet discharge tray 62.

The scanner 18 reads the manuscript M to acquire image data. The scanner 18 is placed in the space 53 at the opposite side to the arrangement surface 51 of the document table 16. The scanner 18 includes an image sensor 71, an illumination lamp 72, a first optical element 73, a second optical element 74, a third optical element 75, a fourth optical element 76, a movement mechanism 77, and the like.

The image sensor 71 is an image capturing element in which pixels for converting the light to an electric signal (image signal) are linearly arranged. The image sensor 71 is constituted by, for example, a CCD (Charge Coupled Device), a CMOS (Complementary Metal Oxide Semiconductor), or other image capturing elements. The image sensor 71 is provided on a sensor substrate 78. On the sensor substrate 78, a signal processing circuit for reading the image signal from the image sensor 71 and generating image data is arranged. The signal processing circuit generates image data represented by digital RGB by executing a signal processing on the image signal output from the image sensor 71. Specifically, the signal processing circuit generates a JPEG image based on the image signal output from the image sensor 71.

A direction in which the pixels of the image sensor 71 are arranged is referred to as a main scanning direction. A direction parallel to the arrangement surface 51 and orthogonal to the main scanning direction is referred to as a sub-scanning direction.

The illumination lamp 72 irradiates the manuscript M with the light from the space 53 side through the glass plate 52. The illumination lamp 72 includes a light source 81 and an optical element 82 which illuminates the manuscript M with light from the light source 81. The light source 81 is, for example, a light emitting diode or a fluorescent lamp. The optical element 82 illuminates a reading range of the scanner 18 with the light emitted by the light source 81. The reading range is a line-shaped area extending in the main scanning direction on the arrangement surface 51 of the document table 16.

The first optical element 73 is a mirror that reflects the light from the reading range and makes the reflected light incident on the second optical element 74.

The second optical element 74 is a mirror that reflects the light from the first optical element 73 and makes the reflected light incident on the third optical element 75.

The third optical element 75 is a mirror that reflects the light from the second optical element 74 and makes the reflected light incident on the fourth optical element 76.

The fourth optical element 76 is a lens for imaging the light from the third optical element 75 on the pixels of the image sensor 71.

The movement mechanism 77 moves the illumination lamp 72 and the first optical element 73 in the sub-scanning direction in the space 53. The position of the reading range described above is determined by a positional relationship among the image sensor 71, the first optical element 73, the second optical element 74, the third optical element 75 and the fourth optical element 76 and optical characteristics of the fourth optical element 76. The movement mechanism 77 moves the reading range in the sub-scanning direction by moving the illumination lamp 72 and the first optical element 73 in the sub-scanning direction.

With the above constitution, the scanner 18 irradiates the reading range with the light by the illumination lamp 72, and images the light reflected at the position overlapping with the reading range of the manuscript M on the pixels of the image sensor 71 with the first optical element 73, the second optical element 74, the third optical element 75 and the fourth optical element 76. As a result, the scanner 18 generates image data based on the light intensity from the reading range by the image sensor 71.

The scanner 18 continuously acquires the image data with the image sensor 71 while the movement mechanism 77 moves the reading range if the manuscript M is placed on the arrangement surface 51 of the document table 16. In this way, the scanner 18 acquires the entire image data of the manuscript M placed on the arrangement surface 51 of the document table 16.

In the scanner 18, if the manuscript M is placed in the sheet feed tray 61 of the ADF 17, the movement mechanism 77 moves the reading range to a position where the manuscript M closely contacts the glass plate in a case in which the manuscript is conveyed by the ADF 17. Furthermore, the scanner 18 successively acquires the image data with the image sensor 71 while the ADF 17 conveys the manuscript M. As a result, the scanner 18 acquires the entire image data of the manuscript M placed in the sheet feed tray 61 of the ADF 17.

The control system of the image forming apparatus 1 is described.

The storage 19 is capable of storing various information. The storage 19 stores, for example, setting of the image forming apparatus 1. In addition, the storage 19 stores the image data of the manuscript M. The storage 19 is, for example, a semiconductor memory or another storage device. The storage 19 may be constituted by a memory interface such as a card slot into which a storage medium such as a memory card can be inserted.

The display 20 is used for displaying a screen in accordance with a video signal input from the controller 23, or a display controller such as a graphic controller (not shown). For example, a screen for setting the image forming apparatus 1 is displayed on the display 20.

The operation member 21 generates an operation signal based on an operation. The operation member is, for example, a touch sensor, numeric keys, a power key, a sheet feed key, various function keys, a keyboard, or the like. The touch sensor is, for example, a resistive touch sensor or a capacitive touch sensor. The touch sensor acquires information indicating a designated position within a certain region. The touch sensor is constituted as a touch panel integrally with the display 20 described above, thereby generating a signal indicating a touched position on the screen displayed on the display 20.

The communication interface 22 is used for communicating with other devices. The communication interface 22 is used for communicating with, for example, a host device that transmits the print data to the image forming apparatus 1. The communication interface 22 may execute wireless communication with other devices according to standards such as Bluetooth® Technology or Wi-fi® Technology.

The controller 23 controls various operations of the image forming apparatus 1 to execute an image processing. The controller 23 functions as the image processing apparatus. The controller 23 includes an arithmetic element 91 and a memory 92.

The arithmetic element 91 executes an arithmetic processing. The arithmetic element 91 is, for example, a CPU. The arithmetic element 91 executes various processing based on a program stored in the memory 92.

The memory 92 stores programs and data used in the program. Further, the memory 92 temporarily stores the data being processed by the arithmetic element. The memory 92 is, for example, a RAM, a ROM or the like.

The controller 23 controls the operations of the image forming section 12, the conveyance section 15, the ADF 17 and the scanner 18 by executing the program stored in the memory 92 by the arithmetic element 91.

For example, if the arithmetic element 91 receives the print data from the host device via the communication interface 22, by controlling the operations of the image forming section 12 and the conveyance section 15, an image based on print data is formed on the printing medium P.

For example, the arithmetic element 91 controls the operation of the scanner 18 to enable the scanner 18 to read the manuscript M in a case in which the manuscript M is placed on the arrangement surface 51 of the document table 16 and an instruction to perform scanning is input by the operation member 21. For example, the arithmetic element 91 controls the operations of the scanner 18 and the ADF 17 to enable the scanner 18 to read the manuscript M in a case in which the manuscript M is placed in the sheet feed tray 61 of the ADF 17 and the instruction to perform the scanning is input by the operation member 21. The arithmetic element 91 acquires the image data (hereinafter, referred to as first image data) generated by the scanner 18.

Figure 3:
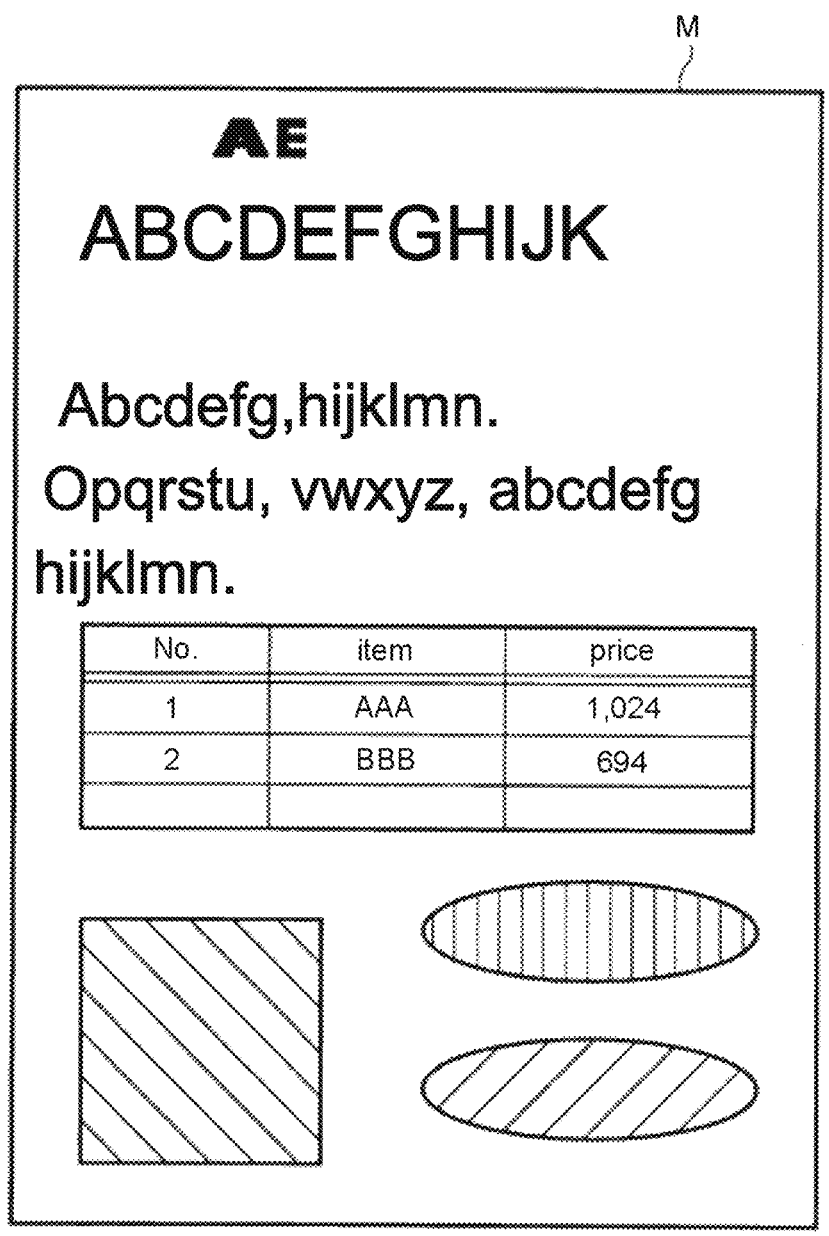
FIG. 3 is a diagram illustrating an example of a manuscript read by a scanner of the image processing apparatus according to the embodiment.

FIG. 3 is a diagram illustrating an example of the manuscript M that the scanner 18 reads. The manuscript M is assumed to be an irregular type manuscript, not a predetermined size (for example, a preset size such as A4, B4 and A3) manuscript.

The arithmetic element 91 controls the scanner 18 to read an image from a range corresponding to a predetermined size wider than the manuscript M if the scanner 18 reads the image.

Figure 4:
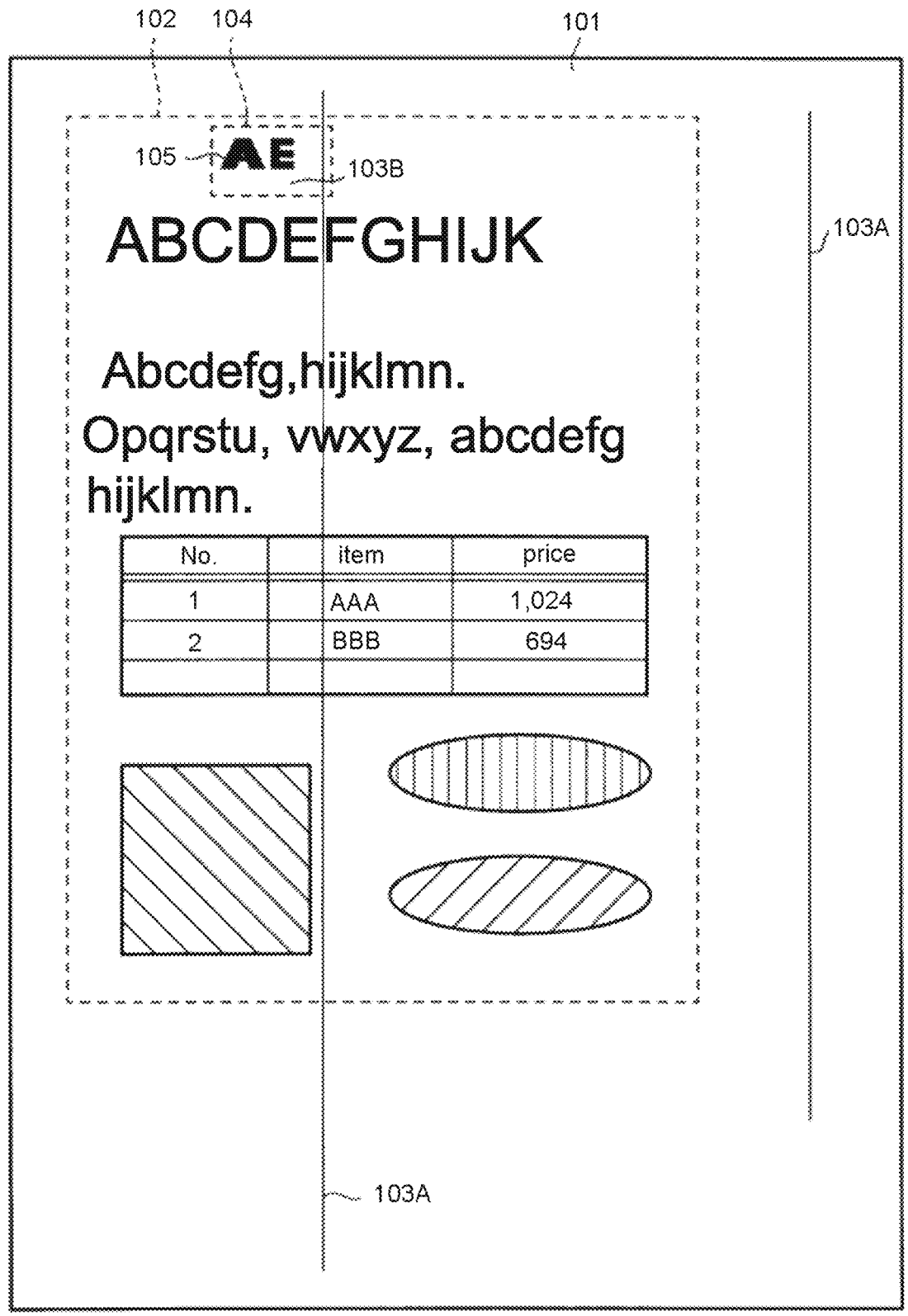
FIG. 4 is a diagram illustrating an example of a first image data acquired from the scanner of the image processing apparatus according to the embodiment.

FIG. 4 is a diagram illustrating an example of the first image data 101 acquired from the scanner 18.

The first image data 101 includes a manuscript area 102 corresponding to the manuscript M. The manuscript area 102 contains images such as characters and illustrations.

At the time the scanner 18 reads the manuscript M, if an obstacle (for example, rubbish) exists on an optical path of the scanner 18, noise occurs in the first image data 101. For example, if the obstacle is not attached to the glass plate 52 but adheres to any constitution of the scanner 18, as shown in FIG. 4, a noise 103A occurs in a line shape on the first image data 101 in a direction corresponding to the sub-scanning direction described above. For example, if the obstacle is attached to the glass plate 52, a noise 103B is generated on the first image data 101 as shown in FIG. 4.

The arithmetic element 91 executes a predetermined image processing on the first image data 101 acquired from the scanner 18 to generate the second image data. Based on the second image data, the arithmetic element 91 recognizes the printing area in which characters and illustrations are printed. The printing area is cut out from the first image data 101 to generate a third image data. As a result, the arithmetic element 91 generates the third image data which includes the printing area in which characters and illustrations are printed in the manuscript M, and in which surplus area (margin) is deleted. The arithmetic element 91 stores the generated third image data in the storage 19.

Next, a processing of storing the third image data (manuscript cutout processing) based on the first image data 101 acquired from the scanner 18 is described.

Figure 5:
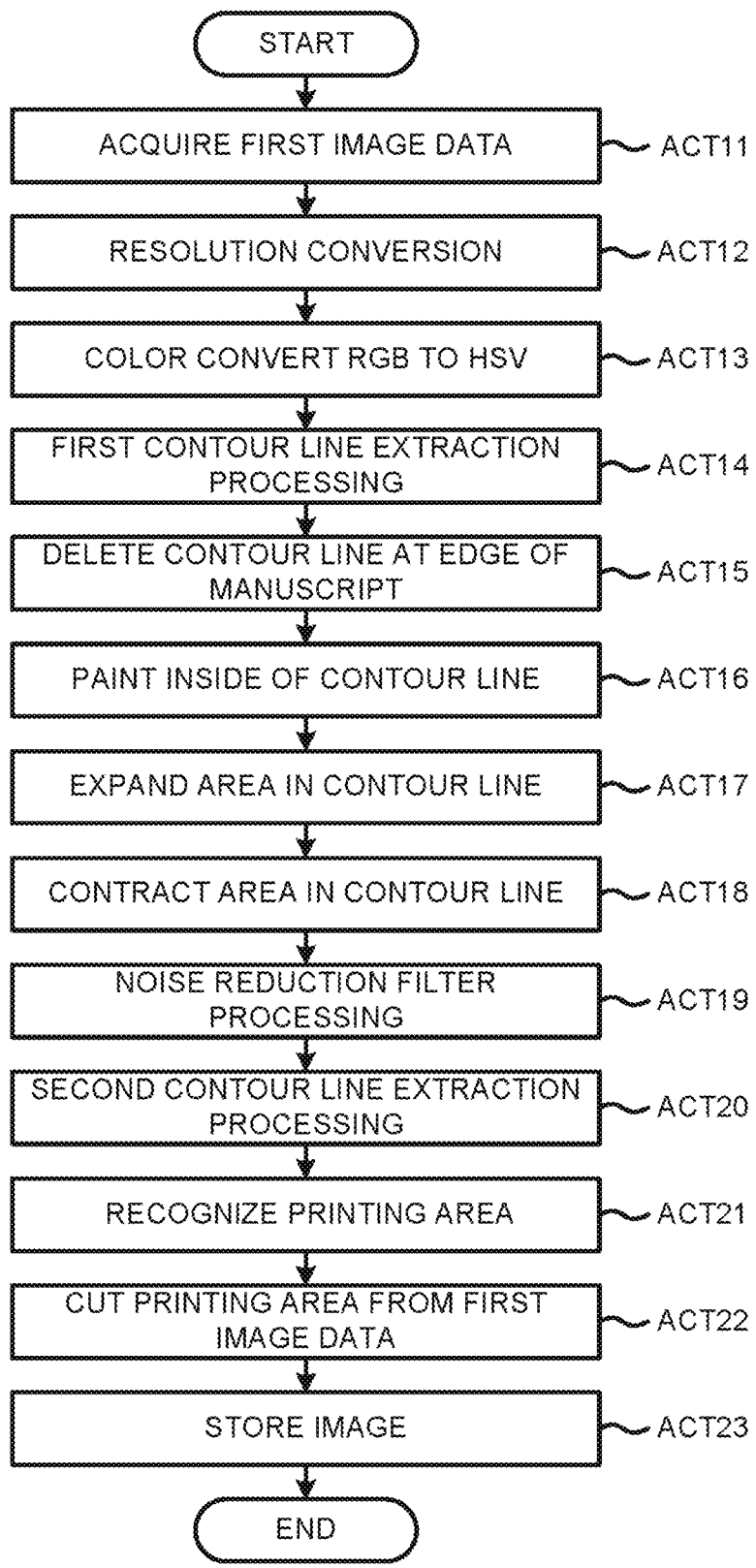
FIG. 5 is a diagram illustrating an example of a manuscript cutout processing executed by an arithmetic element of the image processing apparatus according to the embodiment.
Figure 6:
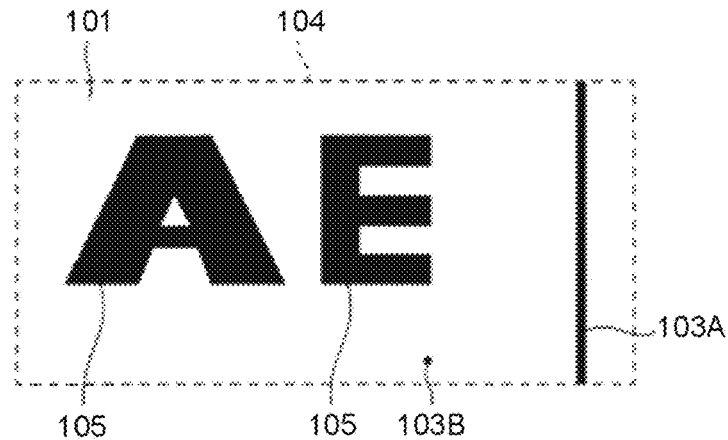
FIG. 6 is a diagram illustrating a part of a first image data in FIG. 4 in an enlarged manner.
Figure 7:
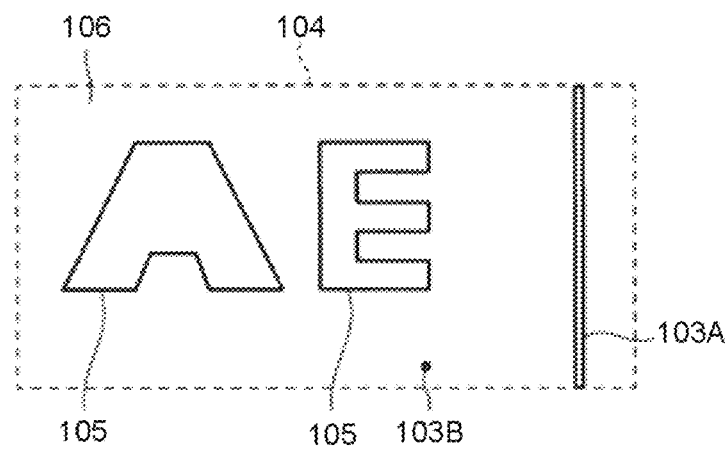
FIG. 7 is a diagram illustrating an example of a first contour line image indicating a contour line.
Figure 8:
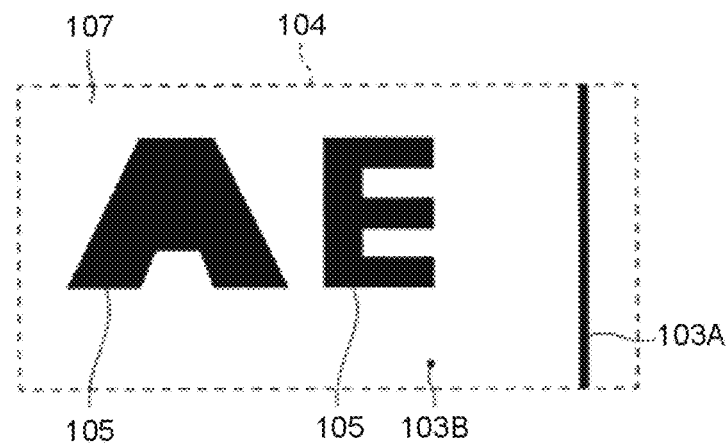
FIG. 8 is a diagram illustrating an example of a second contour line image obtained by painting the inside of the contour line in the first contour line image.
Figure 9:
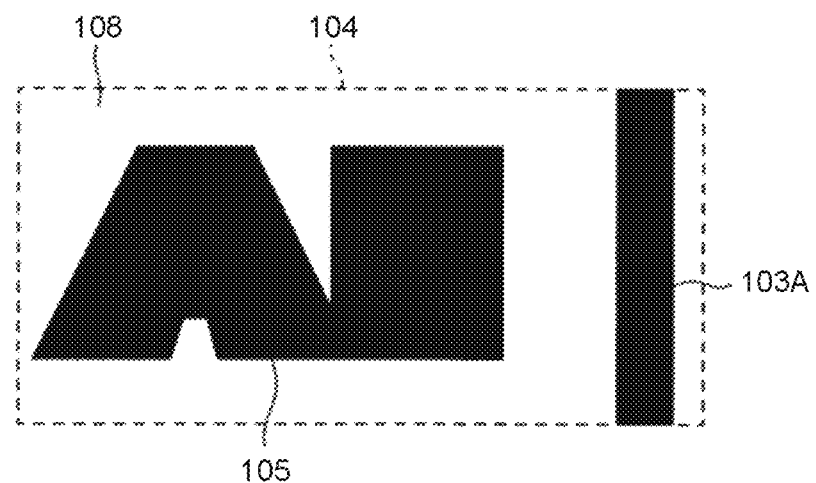
FIG. 9 is a diagram illustrating an example of a third contour line image obtained by expanding the contour line in the second contour line image.
Figure 10:
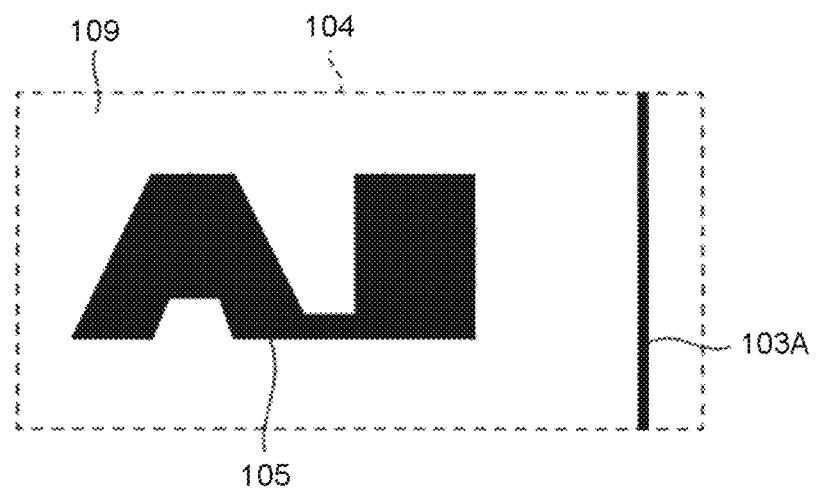
FIG. 10 is a diagram illustrating an example of a fourth contour line image obtained by contracting the contour line in the third contour line image.
Figure 11:
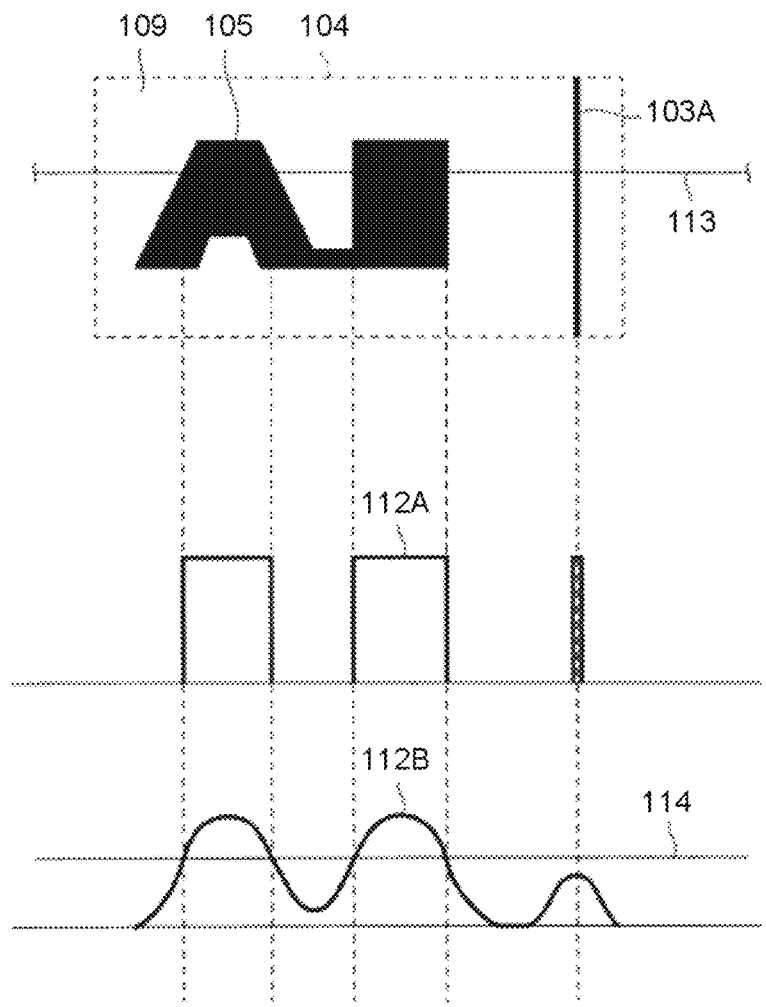
FIG. 11 is a diagram illustrating an example of a filter processing on the fourth contour line image.
Figure 12:
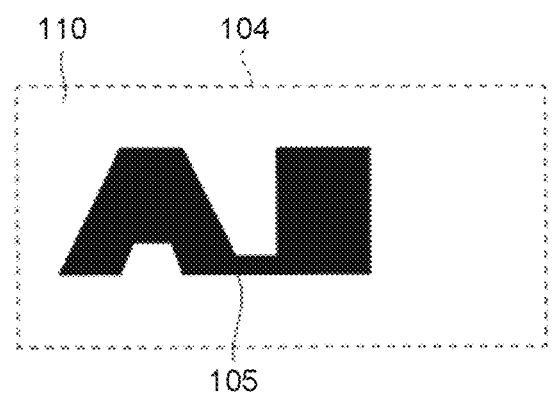
FIG. 12 is a diagram illustrating an example of a second image data obtained by executing an image processing on the first image data.
Figure 13:
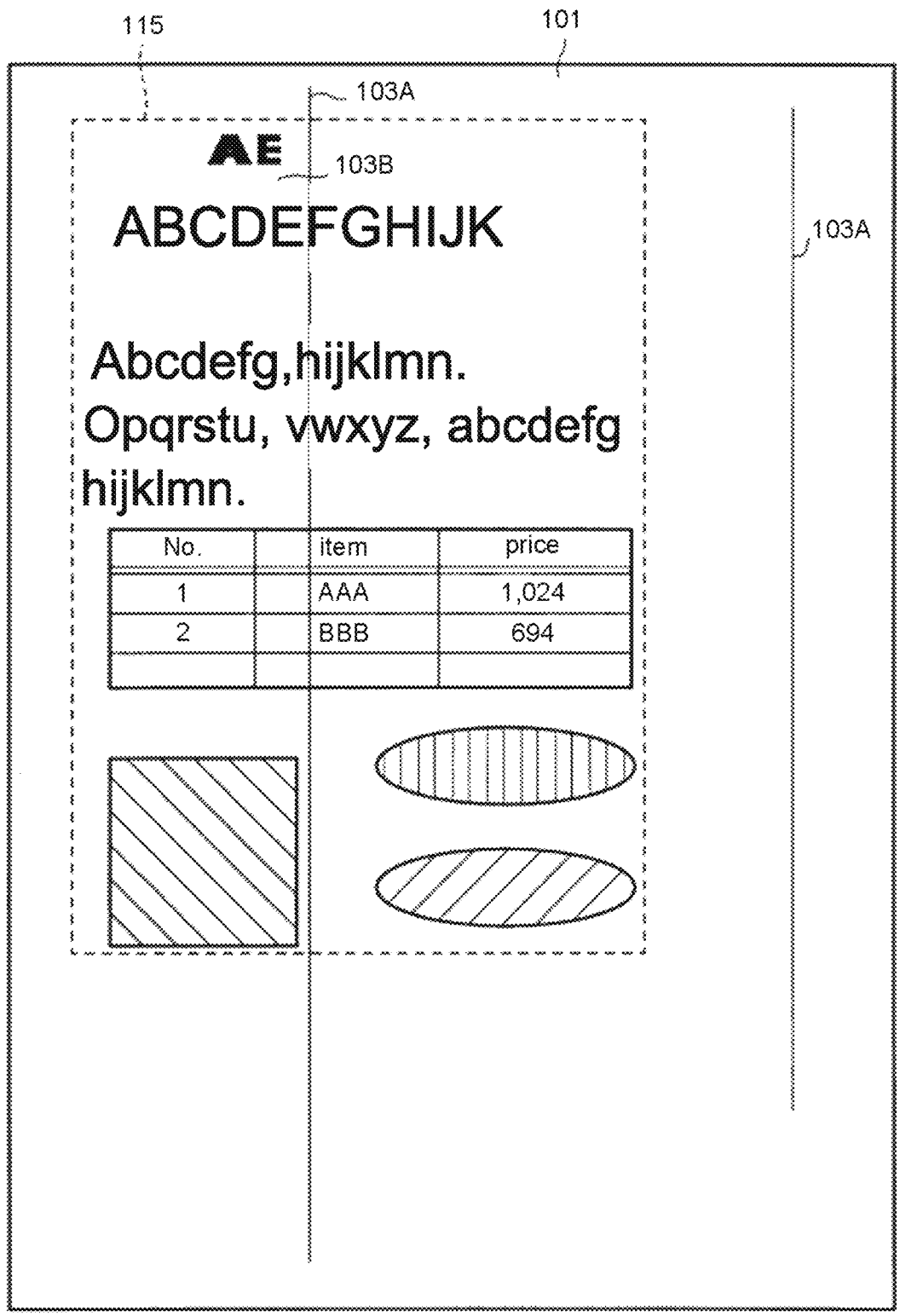
FIG. 13 is a diagram illustrating an example in which a printing area is set in the first image data.
Figure 14:
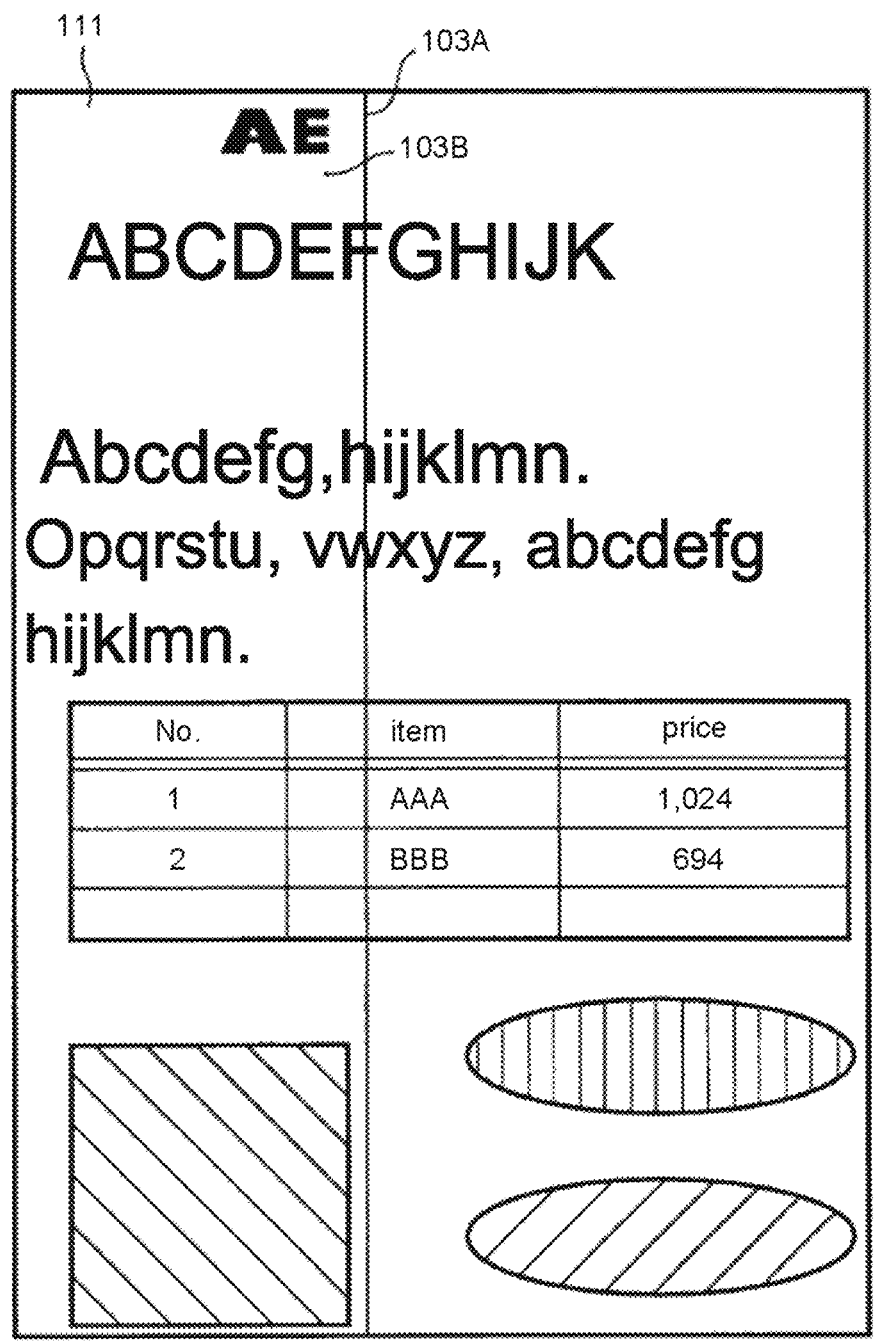
FIG. 14 is a diagram illustrating an example of a third image data obtained by cutting an image in the printing area from the first image data.

FIG. 5 is a diagram illustrating an example of a manuscript cutout processing executed by the arithmetic element 91. FIG. 6 is a diagram illustrating an area 104 of the first image data in FIG. 4 in an enlarged manner. The area 104 includes a character 105, a noise 103A, and a noise 103B. FIG. 7 is a diagram illustrating a first contour line image 106 indicating a contour line. FIG. 8 is a diagram illustrating a second contour line image 107 obtained by painting the inside of the contour line in the first contour line image 106. FIG. 9 is a diagram illustrating a third contour line image 108 obtained by expanding the contour line in the second contour line image 107. FIG. 10 is a diagram illustrating a fourth contour line image 109 obtained by contracting the contour line in the third contour line image 108. FIG. 11 is a diagram illustrating a filter processing on the fourth contour line image 109. FIG. 12 is a diagram illustrating an example of a second image data 110 obtained by executing an image processing on the first image data 101. FIG. 13 is a diagram illustrating an example in which a printing area 115 is set in the first image data 101; and FIG. 14 is a diagram illustrating an example of a third image data 111 obtained by cutting an image in the printing area 115 from the first image data 101.

The arithmetic element 91 acquires the first image data 101 generated by the scanner 18 (ACT 11). The arithmetic element 91 develops the acquired first image data 101 in the memory 92. The arithmetic element 91 may rotate the first image data 101 at the time of acquiring image data from the scanner 18. The degree of certainty to rotate is a predetermined angle such as 90° or 180°, for example.

The arithmetic element 91 executes resolution conversion to convert the resolution of the first image data 101 (ACT 12). For example, the arithmetic element 91 reduces resolution of the first image data 101 acquired from the scanner 18. This makes it possible to speed up the processing at the subsequent stage. Specifically, the image data acquired by the scanner 18 at 600 dpi is reduced by a projection method and converted to a resolution (for example, 200 dpi) designated by the user. If it is not necessary to speed up the processing, the arithmetic element 91 may omit the processing in the ACT 12.

The arithmetic element 91 executes color conversion for converting a color space on the first image data 101 (ACT 13). For example, the arithmetic element 91 converts the first image data 101 shown by the RGB color space to an HSV color space represented by hue, saturation, and lightness (Value). As a result, the arithmetic element 91 can execute the processing at the subsequent stage on the first image data 101 according to color perception characteristics of the human. The arithmetic element 91 may omit the processing in the ACT 13 and execute processing at the subsequent stage using the image data of the RGB color space.

The arithmetic element 91 extracts the contour line of the first image data 101 and executes a first contour line extraction processing for generating a contour line image (ACT 14). As a result, the arithmetic element 91 generates the first contour line image 106 shown in FIG. 7 based on the first image data 101 shown in FIG. 6. Specifically, the arithmetic element 91 binarizes a V component and an S component in the HSV color space, respectively. For example, the arithmetic element 91 binarizes the V component and the S component in the HSV color space based on a fixed threshold value. The arithmetic element 91 binarizes the V component and the S component in the HSV color space by a discrimination analysis method (binarization of Otsu), respectively. The arithmetic element 91 detects the contour line with respect to the first image data 101 in which the V component and the S component are respectively binarized to generate the first contour line image 106.

The arithmetic element 91 deletes the contour line occurring at the edge of a manuscript region 102 in the first contour line image 106 (ACT 15).

The arithmetic element 91 paints the inside of the contour line in the first contour line image 106 to generate the second contour line image 107 shown in FIG. 8 (ACT 16). The arithmetic element 91 paints the inside of the contour line in each of the V component and the S component of the first contour line image 106. Furthermore, the arithmetic element 91 synthesizes the V component and the S component by logical disjunction. The arithmetic element 91 calculates the area of an area surrounded by the contour line for each contour line in an image synthesized by logical disjunction, and removes (paint it with white or black) an area having an area below a preset threshold value. In the example in FIG. 8, since the area of the area surrounded by the contour line of the noise 103B is less than the threshold value, the noise 103B is painted white to be removed.

The arithmetic element 91 expands an area surrounded by the contour line of the second contour line image 107 to generate the third contour line image 108 shown in FIG. 9 (ACT 17). For example, the arithmetic element 91 expands the area surrounded by the contour line by moving the contour line outward. The arithmetic element 91 converts the contour lines of plural characters 105 adjacent to each other to one contour line by connecting the overlapped contour lines.

The arithmetic element 91 contracts an area surrounded by the contour line of the third contour line image 108 to generate the fourth contour line image 109 shown in FIG. 10 (ACT 18). For example, the arithmetic element 91 contracts the area surrounded by the contour line by moving the contour line inward. In this case, since the contour lines of a plurality of adjacent characters 105 are connected, the arithmetic element 91 can recognize adjacent plural characters 105 as an area surrounded by one contour line.

Next, the arithmetic element 91 executes a noise reduction filter processing to reduce noise on the fourth contour line image 109 (ACT 19). The noise reduction filter processing is, for example, a smoothing filter processing. The arithmetic element 91 converts the fourth contour line image 109 to multilevel values. For example, the arithmetic element 91 converts the fourth contour line image 109 to 8 bit data.

A graph 112A in FIG. 11 is a graph showing pixel values on a line 113 corresponding to the main scanning direction of the fourth contour line image 109 subjected to a multivalue processing. As shown by the graph 112A, in the fourth contour line image 109, the contour line is emphasized and the contrast thereof is high.

The arithmetic element 91 applies a predetermined filter (smoothing filter) to the fourth contour line image 109 subjected to the multivalue processing. The smoothing filter smoothes the pixel values in the direction corresponding to the main scanning direction in the fourth contour line image 109. Since the noise 103B is averaged with surrounding white pixels by the smoothing filter, the pixel valued thereof become small.

A graph 112B in FIG. 11 shows pixel valued on the line 113 of the fourth contour line image 109 to which the smoothing filter is executed. As shown by the graph 112B, the pixel values of the fourth contour line image 109 are smoothed in the main scanning direction, and the contrast is decreased. In other words, the arithmetic element 91 reduces the contrast of the fourth contour line image 109 by executing the noise reduction filter processing. The arithmetic element 91 may also apply the smoothing filter in the sub-scanning direction. Furthermore, the arithmetic element 91 may adjust smoothed intensities respectively in the main scanning direction and the sub-scanning direction by applying the smoothing filters with different filter sizes in the main scanning direction and the sub-scanning direction.

Next, the arithmetic element 91 extracts the contour line of the fourth contour line image 109 to which the smoothing filter is applied, and executes a second contour line extraction processing to generate the second image data 110 (ACT 20). The arithmetic element 91 binarizes the fourth contour line image 109 based on a threshold value 114 shown in FIG. 11 and the pixel value of each coordinate of the fourth contour line image 109 to which the smoothing filter is applied. For example, the arithmetic element 91 binarizes the fourth contour line image 109 based on the fixed threshold value 114 and the pixel value of each coordinate of the fourth contour line image 109 to which the smoothing filter is applied. The arithmetic element 91 may binarize the fourth contour line image 109 by determining the threshold value 114 based on a histogram of the pixel value of the fourth contour line image 109 to which the smoothing filter is applied. The arithmetic element 91 detects the contour line of the binary fourth contour line image 109 and paints the area surrounded by the contour line to generate the second image data 110 shown in FIG. 12.

Based on the second image data 110, the arithmetic element 91 recognizes the printing area in which characters and illustrations are printed (ACT 21). The arithmetic element 91 recognizes one rectangular area including a location where the contour line exists in the second image data 110 as the printing area.

Furthermore, the arithmetic element 91 sets the printing area 115 in the first image data 101 as shown in FIG. 13. In the case in which the resolution conversion is executed in the ACT 12, the arithmetic element 91 recognizes the printing area on the first image data 101 based on the correspondence relationship between the coordinates of the first image data 101 and the coordinates of the second image data 110. If the resolution conversion in ACT 12 is not executed, the arithmetic element 91 uses the coordinate of the printing area in the second image data 110 as the coordinate of the printing area 115 of the first image data 101 as it is.

The arithmetic element 91 generates the third image data 111 shown in FIG. 14 by cutting out the image in the printing area from the first image data 101 (ACT 22). As a result, the arithmetic element 91 generates the third image data 111 including an area in which characters and illustrations are printed in the manuscript M, and in which the surplus area (margin) is deleted.

The arithmetic element 91 stores the generated third image data 111 (ACT 23). For example, the arithmetic element 91 stores the third image data 111 in the storage 19. The arithmetic element 91 may output the third image data 111 to an external device of the image forming apparatus 1 via the communication interface 22.

By the processing in ACT 16 to ACT 20, the arithmetic element 91 can exclude a pattern short in the direction corresponding to the main scanning direction from the second image data 110 for recognizing the printing area. The arithmetic element 91 of the controller 23 of the image forming apparatus 1 acquires the first image data 101 which is an original image, and executes the image processing on the first image data 101, whereby the second image data 110 without the noise is generated. The arithmetic element 91 recognizes the printing area 115 in the first image data 101 based on the second image data 110. Thus, it is possible to prevent the noise as described above from affecting the recognition of the printing area. Further, the arithmetic element 91 cuts the image in the printing area 115 from the first image data 101 as the third image data 111. As a result, the image forming apparatus 1 can detect the printing area of the manuscript without being affected by the noise.

The image forming apparatus 1 cuts the image in the printing area 115 from the first image data 101 acquired from the scanner 18 but not the second image data 110 subjected to the image processing for recognition of the printing area. As a result, lines extending in the main scanning direction can be left in the cut third image data 111.

In ACT 22, the arithmetic element 91 may tilt the printing area 115 at the time of cutting the image in the printing area 115 from the first image data 101, and cut the image in the tilted printing area 115 from the first image data 101. For example, at the time of setting the printing area 115 in the first image data, the arithmetic element 91 executes line detection by stochastic Hough transformation, calculates a histogram for each angle of the detected line, and calculates the inclination (skew amount) in the first image data 101 on the basis of a peak of the histogram. The arithmetic element 91 sets the printing area 115 in the first image data 101 with the inclination of the printing area 115 based on the calculated inclination. As a result, the arithmetic element 91 can execute the image cutout and inclination correction at the same time.

In the above embodiment, the arithmetic element 91 of the controller 23 executes the program in the memory 92 to execute the processing in ACT 11 to ACT 23 in FIG. 5, but the constitution is not limited to thereto. The image forming apparatus 1 may be provided with a circuit that executes a part of the processing in ACT 11 to ACT 23. The image forming apparatus 1 may include a plurality of circuits for executing the processing in ACT 11 to ACT 23, respectively.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A non-transitory storage medium, comprising executable instructions that, when executed by a processor, facilitate performance of operations, comprising:
    acquiring, by an arithmetic processor, a first image data read by a scanner from a manuscript containing a printing area;
    generating, by the arithmetic processor, second image data by executing an image processing on the first image data, wherein the second image data is generated by extracting a contour line from the first image data, painting the contour line as a function of a color space, and reducing a contrast of the first image data, wherein the contour line is determined based on respectively binarizing, in relation to a threshold value, a lightness component value and a saturation component value of the color space, wherein the color space comprises a hue component value, the saturation component value, and the lightness component value;
    recognizing, by the arithmetic processor, the printing area in the first image data based on the second image data; and
    facilitating cutting, by the arithmetic processor, an image in the printing area from the first image data as a third image data.

2. The non-transitory storage medium according to claim 1, wherein
    the second image data is generated, by the arithmetic processor, by painting the contour line as a function of the color space, expanding an area surrounded by the contour line, combining the overlapped contour line caused by expansion, contracting the area surrounded by the combined contour line, and reducing the contrast of the first image data.

3. The non-transitory storage medium according to claim 1, wherein
    the second image data is generated, by the arithmetic processor, by reducing the contrast in a direction corresponding to a main scanning direction in the scanner in the first image data.

4. The non-transitory storage medium according to claim 1, wherein
    the second image data is generated, by the arithmetic processor, by reducing contrast as a function of the color space in a direction corresponding to the main scanning direction and in a direction corresponding to a sub-scanning direction in the scanner in the first image data.

5. The non-transitory storage medium according to claim 1, wherein
    the second image data is generated, by the arithmetic processor, by reducing the contrast of the first image data to perform binary processing, extracting the contour line to generate the second image data, and recognizing the printing area on the basis of a rectangular area containing the contour line existing in the second image data.

6. The non-transitory storage medium according to claim 1, further comprising:
    tilting, by the arithmetic processor, the printing area based on inclination in the first image data and cutting an image in the printing area from the first image data as a third image data.

7. A device for correctly detecting a printing area, comprising:
    an arithmetic processor; and
    a memory that stores instructions that, when executed by the arithmetic processor, facilitates performance of operations, comprising:
    acquiring a first image data read by a scanner from a manuscript containing a printing area;
    generating second image data by executing an image processing on the first image data, wherein the second image data is generated by extracting a contour line from the first image data, painting the contour line as a function of a color space, and reducing a contrast of the first image data, wherein the contour line is determined based on respectively binarizing, in relation to a threshold value, a lightness component value and a saturation component value of the color space, wherein the color space comprises a hue component value, the saturation component value, and the lightness component value;
    recognizing the printing area in the first image data based on the second image data; and
    cutting an image in the printing area from the first image data as a third image data.

8. The device according to claim 7, wherein the operations further comprise
    generating the second image data by painting the contour line as a function of the color space, expanding an area surrounded by the contour line, combining the overlapped contour line caused by expansion, contracting the area surrounded by the combined contour line, and reducing the contrast of the first image data.

9. The device according to claim 7, wherein the operations further comprise
    generating the second image data by reducing the contrast in a direction corresponding to a main scanning direction in the scanner in the first image data.

10. The device according to claim 7, wherein the operations further comprise
    generating the second image data by reducing contrast as a function of the color space in a direction corresponding to the main scanning direction and in a direction corresponding to a sub-scanning direction in the scanner in the first image data.

11. The device according to claim 7, wherein the operations further comprise
    generating the second image data by reducing the contrast of the first image data to perform binary processing, extracting the contour line to generate the second image data, and recognizing the printing area on the basis of a rectangular area containing the contour line existing in the second image data.

12. The device according to claim 7, further comprising:
    tilting the printing area based on inclination in the first image data and cutting an image in the printing area from the first image data as a third image data.

13. A method for correctly detecting a printing area comprising:

acquiring, by an arithmetic processor, a first image data read by a scanner from a manuscript containing a printing area;

generating, by the arithmetic processor, second image data by executing an image processing on the first image data, wherein the second image data is generated by extracting a contour line from the first image data, painting the contour line as a function of a color space, and reducing a contrast of the first image data, wherein the contour line is determined based on respectively binarizing, in relation to a threshold value, a lightness component value and a saturation component value of the color space, wherein the color space comprises a hue component value, the saturation component value, and the lightness component value;

recognizing, by the arithmetic processor, the printing area in the first image data based on the second image data; and cutting, by the arithmetic processor, an image in the printing area from the first image data as a third image data.

14. The method according to claim 13, wherein
the second image data is generated, by the arithmetic processor, by painting the contour line as a function of the color space, expanding an area surrounded by the contour line, combining the overlapped contour line caused by expansion, contracting the area surrounded by the combined contour line, and reducing the contrast of the first image data.

15. The method according to claim 13, wherein
the second image data is generated, by the arithmetic processor, by reducing the contrast in a direction corresponding to a main scanning direction in the scanner in the first image data.

16. The method according to claim 13, wherein
the second image data is generated, by the arithmetic processor, by reducing contrast as a function of the color space in a direction corresponding to the main scanning direction and in a direction corresponding to a sub-scanning direction in the scanner in the first image data.

* * * * *